(12) United States Patent
Sager

(10) Patent No.: US 6,196,644 B1
(45) Date of Patent: *Mar. 6, 2001

(54) ANTI-SKID OR ANTI-SLIP BRAKING SYSTEM THAT SUPPRESSES INTERFERENCE SIGNALS AT A MAINS FREQUENCY

(75) Inventor: Frank Sager, Farmington Hills, MI (US)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,158

(22) PCT Filed: Apr. 17, 1996

(86) PCT No.: PCT/DE96/00675

§ 371 Date: Jan. 30, 1997

§ 102(e) Date: Jan. 30, 1997

(87) PCT Pub. No.: WO97/00186

PCT Pub. Date: Jan. 3, 1997

(30) Foreign Application Priority Data

Jun. 19, 1995 (DE) .............................. 195 22 135

(51) Int. Cl.[7] .................. B60T 8/00; B60T 8/32

(52) U.S. Cl. .................. 303/195; 303/168; 303/176; 303/20; 303/199

(58) Field of Search ....................... 303/168, 194, 303/199, 191, 176, 171, 172, 174, 195, 20, 122.02, 122, 122.08, 122.04, 122.03, 196; 188/181 R; 701/78, 74, 76, 70

(56) References Cited

U.S. PATENT DOCUMENTS 4,251,118 * 2/1981 Rothen et al. .
4,497,026 * 1/1985 Braschel et al. .

(List continued on next page.)

FOREIGN PATENT DOCUMENTS

3644263 * 7/1987 (DE) .
4433729 * 3/1995 (DE) .

(List continued on next page.)

* cited by examiner

Primary Examiner—Douglas C. Butler
Assistant Examiner—C Williams
(74) Attorney, Agent, or Firm—Michael J. Striker

(57) ABSTRACT

The method of controlling a motor vehicle braking system to prevent wheel slip or skidding includes generating wheel speed signals indicative of wheel speeds of each of at least two wheels; determining the wheel speeds from each wheel speed signal; determining a vehicle reference speed from one of the wheel speeds; determining whether or not the vehicle reference speed is within a predetermined speed range of 47 to 63 Hz, during which interference signals from a vehicle power source at about a mains frequency are generated that produce false wheel speed signals and controlling the motor vehicle braking system according to a special ABS control method when the vehicle reference speed is within the predetermined speed range. In the special ABS control method the interference signals are accounted for so that improper activation of or influence on the braking system due to the interference signals is prevented. In a preferred embodiment of the method an auxiliary reference speed is determined from a wheel speed of another wheel, the vehicle reference speed is negatively adjusted when the vehicle reference speed is within the predetermined speed range and the nondriven wheels are controlled according to the auxiliary reference speed until the vehicle reference speed falls below a predetermined speed threshold when the vehicle reference speed is within the predetermined speed range.

9 Claims, 2 Drawing Sheets

U.S. PATENT DOCUMENTS

| | | | |
|---|---|---|---|
| 4,504,911 | * 3/1985 | Braschel et al. | 303/168 |
| 4,733,920 | * 3/1988 | Pannbacker . | |
| 4,836,616 | * 6/1989 | Roper et al. . | |
| 5,233,529 | * 8/1993 | Braschel et al. . | |
| 5,583,773 | 12/1996 | Pfau . | |
| 5,612,879 | * 3/1997 | Makimo | 303/168 |

FOREIGN PATENT DOCUMENTS

| | | | |
|---|---|---|---|
| 4405801A1 | | 8/1995 | (DE) . |
| 488405 | * | 6/1992 | (EP) . |
| 2003610 | * | 3/1979 | (GB) . |
| 8202862 | * | 9/1982 | (WO) . |
| 9117072 | * | 11/1991 | (WO) . |
| 9700186 | * | 1/1997 | (WO) . |

ANTI-SKID OR ANTI-SLIP BRAKING SYSTEM THAT SUPPRESSES INTERFERENCE SIGNALS AT A MAINS FREQUENCY

This application is a national stage filing under 35 USC 371 of international application PCT/DE96/00675 filed Apr. 17, 1996.

BACKGROUND OF THE INVENTION

Field of the Invention

The present invention relates to anti-skid or anti-slip brake control systems.

In vehicles that are equipped with an anti-skid or anti-slip brake control system, typically four and in individual cases only three rpm sensors are used, which are assigned to the individual wheels. In general, the output signals of these rpm sensors are pulselike. From the time interval between individual pulses or individual pulse edges, the rpm of the applicable wheel is ascertained.

The vehicle reference speed, which represents an essential variable for the anti-skid or anti-slip brake control is ascertained from the wheel rpm values. The vehicle reference speed is ascertained for instance from the four wheel speeds or from the wheel speed of one wheel, the so-called reference i wheel. From the wheel rpm values, a reference speed can also be formed, which is usable in the ABS control as a further controlled variable.

Since essential variables of the anti-skid or anti-slip brake control system are formed on the basis of output signals of the wheel rpm sensors, reliable monitoring of the operability of the sensors must necessarily be performed. German Patent Application P 44 05 801.2, for instance, has therefore proposed a monitoring system that is used in ABS control systems and makes it possible to detect various malfunctions of the wheel rpm sensors.

Interference signals that correspond approximately to the mains frequency of 50 Hz (or 60 Hz) have proved to be especially problematic in control systems. Such interference signals can be fed to the rpm sensors of the ABS system for instance by magnetic fields generated by vehicle heaters that are operated at the usual mains voltage. In that event, they reflect incorrect wheel speeds to the control unit, and as a result an unintended ABS control can be tripped and maintained.

SUMMARY OF THE INVENTION

It is an object of the present invention to provide a method of suppressing interference signals, especially interference signals approximately at the main power source frequency of 50 or 60 Hz, that effect operation of an anti-skid or anti-slip brake control system.

It is a further object of the present invention to provide an improved anti-skid or anti-slip brake control system, in which interference signals from a vehicle power source at about a mains frequency are accounted for and faulty operation of the braking system due to those interference signals is prevented.

According to the invention the method of controlling a motor vehicle braking system of a motor vehicle to prevent wheel slip or skidding includes:

a) generating wheel speed signals indicative of wheel speeds of each of at least two wheels of the motor vehicle;

b) determining the wheel speeds from each of the wheel speed signals;

c) determining a vehicle reference speed from one of the wheel speeds determined in step b) for one of the at least two wheels;

d) determining whether or not the vehicle reference speed ascertained in step c) is within a predetermined speed range of 47 to 63 Hz, during which interference signals from a vehicle power source at about a mains frequency are generated that produce false wheel speed signals; and e) controlling the motor vehicle braking system according to a special ABS control method when the vehicle reference speed is within the predetermined speed range according to step d), this special ABS control method comprising a accounting for the interference signals in such a manner that improper activation of or influence on the braking system due to the interference signals is prevented.

The invention also resides in an improved ABS system designed to perform the above-described method according to the invention.

The anti-skid or anti-slip brake control systems according to the invention, have the advantage that interference signals that occur at a frequency corresponding to the usual mains frequency are reliably precluded from the evaluation of the rpm sensor signals and the vehicle reference speed formed from those signals. Thus advantageously the control properties of the ABS can be maintained even in the critical speed range. Interference at mains frequency no longer trips any control, and any existing control is ended if the vehicle stops.

These advantages are attained in that the anti-blocking control, in a critical speed range in which the frequency of the wheel rpm sensor signals of the reference wheel are in the range of 50 Hz, effects a particular adjustment of the current vehicle reference speed and the so-called auxiliary reference speed. In the process, the vehicle reference speed is negatively adjusted in a range between 63 and 47 Hz. If the wheel speed is between a minimum value vmin and 47 Hz, then the signal cannot be caused by interference, and the vehicle reference speed can then be reformed reliably on the basis of the wheel speed.

Further advantageous features of the invention are attained with the provisions recited in the dependent claims.

BRIEF DESCRIPTION OF THE DRAWING

One exemplary embodiment of the invention is shown in the drawing and will be described in further detail in the ensuing description. Specifically.

FIG. 3 shows speed courses in the critical range over time;

DESCRIPTION OF THE PREFERRED EMBODIMENT

Figure 1:
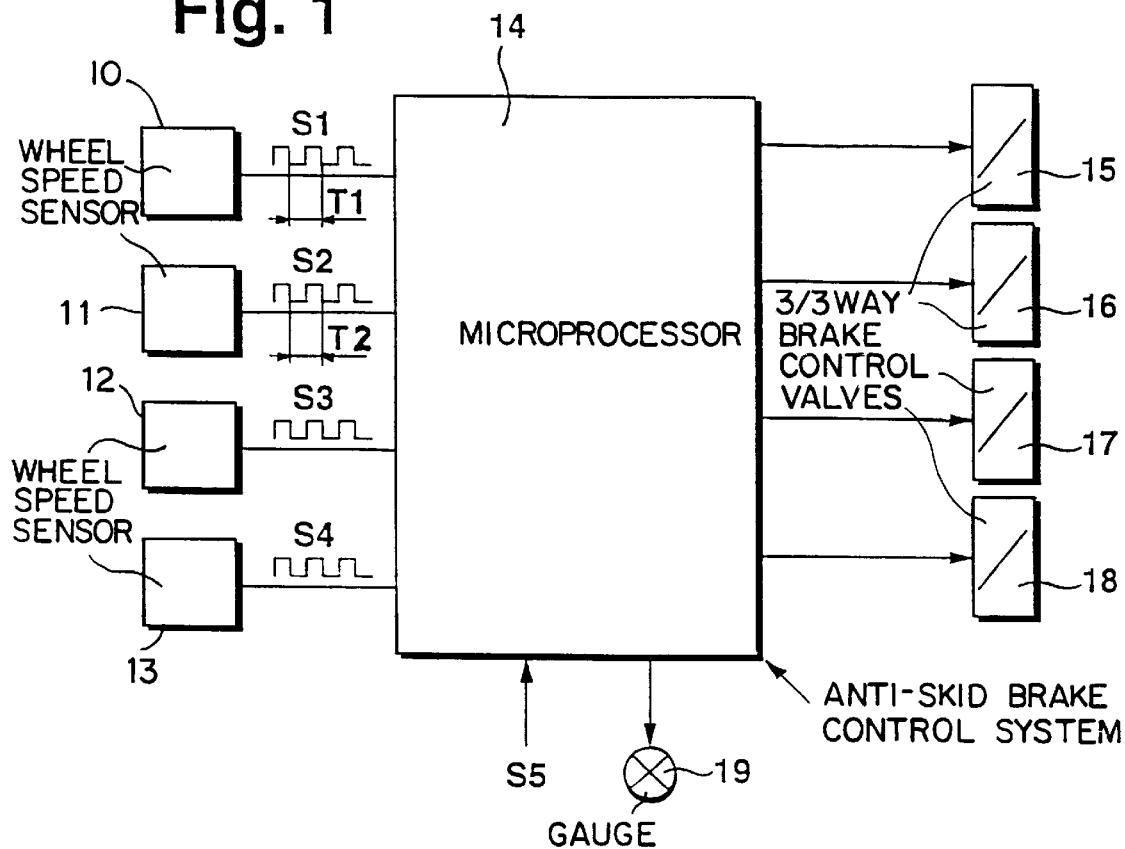
FIG. 1 is a block circuit diagram showing components of an anti-lock or anti-slip brake control system that are essential to the comprehension of the invention.

In FIG. 1, the rpm sensors associated with the individual wheels are identified by reference numerals 10, 11, 12 and 13. They furnish the output signals S1, S2, S3, S4. Typically, these signals are composed of a chronological succession of pulses. From the intervals between pulses or between identical pulse edges, the speeds of the individual wheels, or wheel rpm values, that are required for the ABS control are ascertained in the evaluation arrangement 14, which typically is a microprocessor. The time intervals to be evaluated are designated as T1–T4 for the individual signals S1–S4. The evaluation arrangement 14 is equivalent to the usual evaluation circuits or control units in anti-skid or anti-slip brake control systems. It therefore includes a central arithmetic unit, memories, comparators, and optionally other logic elements. The basic mode of operation of an ABS control is described in "Bosch: Kraftfahrtechnisches Taschenbuch" [Bosch: Automotive Handbook], 19th edition, pp. 518–523, for instance.

The evaluation device 14, on the basis of the signals S1–S4, forms control pulses by way of which the ABS control is performed. For instance, the 3/3-way valves 15–18 assigned to the wheel brakes are triggered by the evaluation device. Plausibility observations or error detections that are also done are displayed or indicated with the aid of a display or gauge 19. Other items of information furnished to the evaluation arrangement and possibly furnished by corresponding sensors are identified by the symbol S5.

From the time intervals T1–T4 of the various signals S1–S4, the vehicle reference speed and an auxiliary reference speed are both ascertained. The procedure can be learned from FIG. 2.

Figure 2:
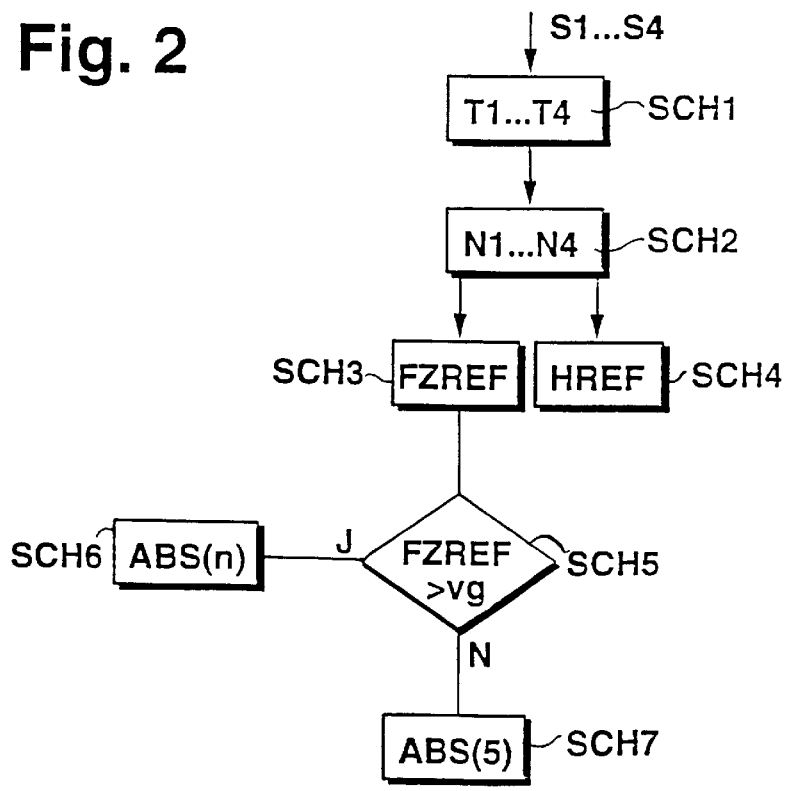
FIG. 2 shows a flowchart that schematically illustrates the ABS control process including suppression of interference signals according to the invention.

As shown in FIG. 2, time intervals between successive edges of the various signals are measured in the evaluation device. In each program cycle, for each signal S1–S4, a respective time interval T1–T4 is ascertained (step SCH1). On the basis of these times, the associated wheel speeds v1–v4 are determined in the usual way (step SCH2).

From the speed of the second-fastest wheel, for instance, which in this case is the reference wheel, the vehicle reference speed FZREF is ascertained in step SCH3; in the usual way, the known wheel circumference and the number of teeth of the transducer wheel are also taken into account. A more detailed description of the procedure is given for instance in German Patent Disclosure DE-P 44 05 801.2.

Along with the vehicle reference speed FZREF, one further reference speed is also formed, namely the auxiliary reference speed HREF on the basis of the speed of the fastest wheel. In FIG. 2, this is shown as step SCH4. For obtaining the auxiliary reference speed HREF, the same conditions as for ascertaining the vehicle reference speed also pertain. In principle, the vehicle reference speed and the auxiliary reference speed can also be formed by other criteria, but the one reference speed is formed from the wheel speed of one wheel, and the other reference speed is formed from the wheel speed of another wheel.

In step SCH5, the vehicle reference speed is compared with a limit value. This limit value vg corresponds to a signal frequency of 63 Hz, or a speed of 9 km/h. If the vehicle reference speed is greater than this limit value, then the normal ABS control (ABS(n), step SCH6 is active and controlling). If the vehicle reference speed FZREF is conversely lower than this first limit value vg, then a special ABS control process runs, which is designated as step SCH7 and is explained below in conjunction with FIG. 3; it is intended to assure that interference that might occur will remain without consequences.

In FIG. 3, speeds are shown plotted over the time t for various conditions; the vehicle reference speed FZREF is shown as a dashed line, and the auxiliary reference speed HREF is shown as a dotted line. The speed of the reference wheel is designated by the symbol vR. The frequencies of 63 Hz, 47 Hz and 16 Hz, shown as horizontal lines, correspond to speeds of 9 km/h, 6.75 km/h and 2.75 km/h; this last speed is also designated as vmin.

Figure 3A:
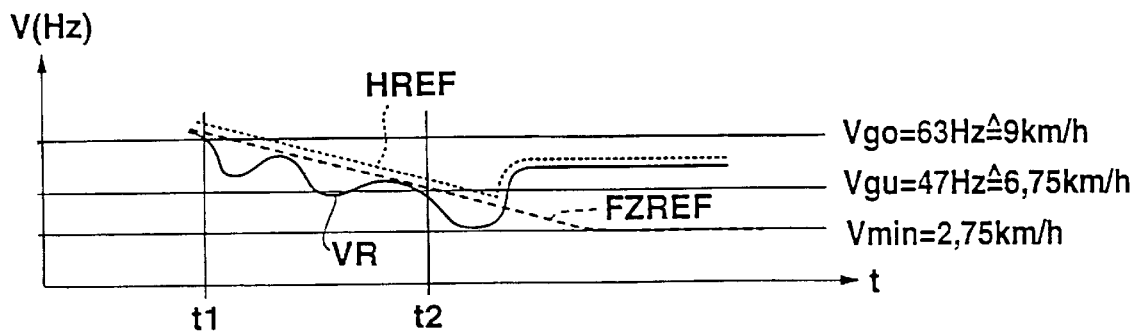
FIG. 3a shows a first example.

FIG. 3a shows a case in which wheel speed vR is located in the critical range between 63 Hz and 47 Hz. The vehicle reference speed FZREF is therefore negatively adapted in this range. Accordingly, every newly ascertained vehicle reference speed is used as the vehicle reference speed whenever it is lower than the preceding vehicle reference speed; if not, the vehicle reference speed is necessarily lowered.

If the wheel speed of the reference wheel falls below the lower limit value vgu of 47 Hz, an adaptation of the vehicle reference speed can again be done on the basis of the wheel speed of the reference wheel. If 50 Hz interference occurs, however, this makes it seem as though the reference wheel is 50 Hz, which is again in the critical range, so that the vehicle reference speed continues to be negatively adapted until it attains a value of vmin=2.75 km/h.

Figure 3B:
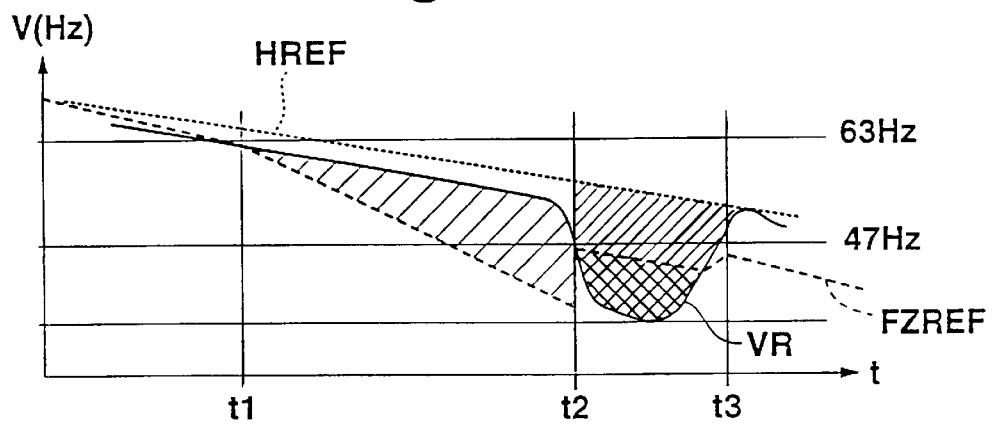
FIG. 3b shows the speed courses for control at a low coefficient of friction.

FIG. 3b shows an example of control at a low coefficient of friction. In this example, the wheel speed vR at time t1 is below the upper limit speed vgo of 63 Hz. If the associated wheel is the reference wheel, then it is in the range of interference at mains frequency. The vehicle reference speed FZREF is therefore negatively adapted for safety's sake, until the wheel speed at time t2 is below a value of 47 Hz. If the reference wheel speed is below this value, or in other words its speed is between the minimum speed vmin and 47 Hz, it is assured that the associated signal is not caused by an interference. The vehicle reference speed can then be set to the wheel speed, and the normal ABS control can be resumed.

If the wheel speed of the reference wheel at time t3 returns to the critical range, the vehicle reference speed is again negatively adapted. In the range between t2 and t3, the adaptation of the vehicle reference speed is effected as a function of the speed of the reference wheel.

In the example shown in FIG. 3b, the vehicle reference speed in the range between t1 and t2 is lower than the wheel speed vR. The slip between the wheel speed and the vehicle reference speed is therefore positive, and no ABS control takes place. Between t2 and t3, slip is present between the vehicle reference speed and the wheel speed, and slip is present with regard to the auxiliary reference speed; normal ABS control takes place.

The ABS control on which FIG. 3 is based functions only whenever some wheels, expediently the nondriven wheels, control in accordance with the auxiliary reference speed and hence are still executing control cycles. If all the wheels were regulated with respect to the vehicle reference speed, then the very slight and under some circumstances even positive slip would no longer suffice to trip a pressure reduction and hence the restarting of the wheel.

Figure 3C:
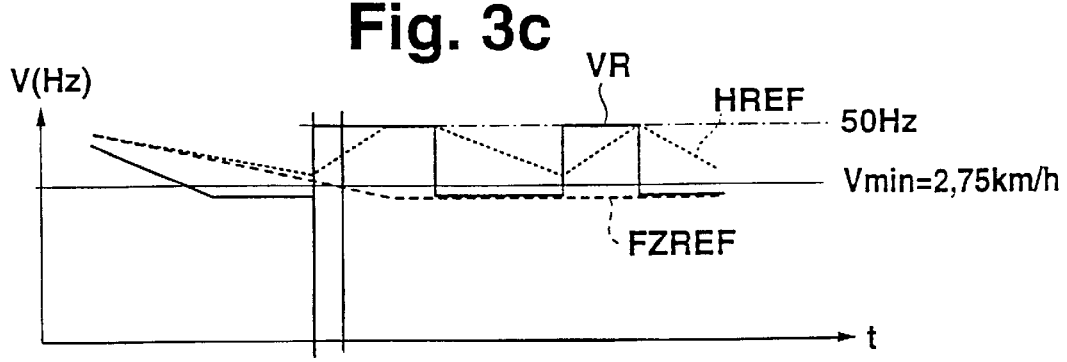
FIG. 3c shows the case where the ABS has already performed control and the vehicle is coming to a stop during interference signals from a heater.

FIG. 3c shows an example in which the ABS is already in control and the vehicle comes to a stop on an interference source, such as a heater. In this example, the vehicle is assumed to come to a stop at time t1. The wheel speed is accordingly zero. Both the vehicle reference speed and the auxiliary reference speed are reduced. At time t2, an interference occurs that makes the wheel speed seem to be 50 Hz. From that moment on, however, the vehicle reference speed does not follow the wheel speed, since the wheel speed is between 47 and 63 Hz. The vehicle reference speed is therefore decreased further, until at time t3 it attains the value of 3 km/h.

In the range between t2 and t3, a pressure reduction can be tripped at the wheels controlled in accordance with the auxiliary reference speed; the essential distinction from control at a low coefficient of friction is that the wheel does not react to the pressure reduction, since after all the vehicle is already stopped. Thus the vehicle reference speed cannot be adapted upward, and at some time it will fall below the limit of 3 km/h. From that moment t3 on, all the wheels again control in accordance with vehicle reference speed. Thus, however, virtually no further slip is calculated, and hence the ABS control is terminated. As long as the vehicle is at a stop, the vehicle reference speed cannot be positively adapted any longer, even if one wheel, because of an interference, jumps back to a speed of 50 Hz. The vehicle reference speed then remains constant, while the auxiliary reference speed follows up the interference values.

As long as the vehicle reference speed is higher than 3 km/h and the auxiliary reference speed HREF is below 15 km/h, the nondriven vehicle axle is controlled in accordance with the auxiliary reference speed. If the ABS control is active, then below a speed that corresponds to 47 Hz, the vehicle reference speed is formed on the basis of the reference wheel.

If the vehicle reference speed is in a range between an upper limit value vmino and a lower limit value vminu, which are 8 km/h and 5 km/h, for example, then a switchover to a further ABS control, so-called vmin control, is made. In this type of control, control is done with less slip than in the normal ABS control.

In the special ABS control, the procedure depends on what conditions prevail. In a range in which the ABS control is not active, it is assumed that the vehicle reference speed FZREF is at the speed vmin and remains there, since in this case the reference wheel speed corresponds to 50 Hz, and the vehicle reference speed FZREF is thus negatively adapted.

In a range in which the ABS control is active but in which an rpm sensor, for instance from 1 to 4 of them, furnishes perturbed signals, an adaptation of the vehicle reference speed or the auxiliary reference speed as shown in FIG. 3a is performed in the range in which the pulse train of the sensor signal is between 63 Hz and a value that corresponds to vmin.

In FIG. 3a, speeds are plotted over time for various conditions; the vehicle reference speed FZREF is shown as a dashed line, and the auxiliary reference speed is shown as a dotted line. In addition, the wheel speed vR that occurs in active ABS control is also shown. The three horizontal lines correspond to signal frequencies of 63 Hz (9 km/h), 47 Hz (6.75 km /h) and 16 Hz at a speed of vmin=2.75 km/h.

As can be seen form FIG. 3a, the vehicle reference speed has a downward course, that is, to lower values down as far as vmin, since the reference wheel is furnishing a frequency of 50 Hz. Below 15 km/h, the front wheels are controlled in accordance with the auxiliary reference speed HREF. The driven wheels are overbraked below 9 km/h, since they are controlled in accordance with the vehicle reference speed. If the vehicle reference speed drops below 3 km/h, then all the wheels again control in accordance with the vehicle reference speed FZREF; thus the control decreases.

If a range is involved in which the ABS control is active and in which a low coefficient of friction (low $\mu$) is also present and if there is no interference, then in the range between 47 and 63 Hz the vehicle reference speed will decrease; the nondriven wheels then continue to be controlled in accordance with the auxiliary reference speed. If after a control phase a wheel starts up again and the speed is then between vmin and 6.75 km/h (corresponding to 47 Hz) and is also the reference wheel for the vehicle reference speed, then the vehicle reference speed is set to this wheel; in other words, the speeds of this wheel are used to form the vehicle reference speed.

In that case, the vmin control is active, and pressure is reduced at pressure control valves associated with the wheels. Since in this case the vehicle reference speed cyclically recovers, control continues to be done by the auxiliary reference speed until the vehicle is at a stop.

This special ABS control, in a speed range in which interference at mains frequency can occur, assures that such interference will not trigger a control by mistake. The existing control is terminated once the vehicle is at a stop.

What is claimed is:

1. A method of controlling a motor vehicle braking system of a motor vehicle to prevent wheel slip or skidding, said method comprising the steps of:
    a) generating wheel speed signals indicative of wheel speeds of each of at least two wheels of the motor vehicle;
    b) determining the wheel speeds from each of the wheel speed signals;
    c) determining a vehicle reference speed from one of the wheel speeds determined in step b) for one of the at least two wheels;
    d) determining whether or not the vehicle reference speed ascertained in step c) is within a predetermined speed range of 47 to 63 Hz, during which interference signals from a vehicle power source at mains frequency are generated that produce false wheel speed signals; and
    e) controlling the motor vehicle braking system according to an ABS control method when the vehicle reference speed is within the predetermined speed range according to step d), the ABS control method comprising a control process in which the interference signals are accounted for, whereby improper activation of or influence on the braking system due to the interference signals is prevented.

2. The method as defined in claim 1, wherein said ABS control method in which the interference signals are accounted for comprises forming an auxiliary reference speed from another one of the wheel speeds of another of said at least two wheels.

3. The method as defined in claim 2, wherein said ABS control method in which the interference signals are accounted for comprises negatively adjusting said vehicle reference speed when said vehicle reference speed is within said predetermined speed range.

4. The method as defined in claim 3, wherein said ABS control method in which said interference signals are accounted for comprises controlling nondriven ones of said at least two wheels according to said auxiliary reference speed until said vehicle reference speed falls below a predetermined speed threshold when said vehicle reference speed is within said predetermined speed range.

5. The method as defined in claim 4, further comprising correcting said vehicle reference speed to a speed of a reference wheel when said speed of said reference wheel is in a wheel speed range in which the interference signals at said mains frequency do not occur.

6. A device for controlling a motor vehicle braking system of a motor vehicle to prevent wheel slip or skidding, said device comprising:

means for generating wheel speed signals indicative of wheel speeds of each of at least two wheels of the motor vehicle;

means for determining the wheel speeds from each of the wheel speed signals;

means for determining a vehicle reference speed from one of the wheel speeds determined for one of the at least two wheels;

means for determining whether or not the vehicle reference speed is within a predetermined speed range of 47 to 63 Hz, during which interference signals from a vehicle power source at about a mains frequency are generated that produce false wheel speed signals; and means for controlling the motor vehicle braking system according to an ABS control method when the vehicle reference speed is within the predetermined speed range, said ABS control method comprising a control process in which the interference signals are accounted for, whereby improper control or influence of said braking system due to said interference signals is prevented.

7. The device as defined in claim 6, wherein said means for controlling according to said ABS control method includes means for forming an auxiliary reference speed from another of the wheel speeds of another of said at least two wheels.

8. The device as defined in claim 7, wherein said means for controlling according to said ABS control method includes means for negatively adjusting said vehicle reference speed when said vehicle reference speed is within said predetermined speed range.

9. The device as defined in claim 8, wherein said means for controlling according to said ABS control method includes means for controlling nondriven ones of said at least two wheels according to said auxiliary reference speed until said vehicle reference speed falls below a predetermined speed threshold when said vehicle reference speed is within said predetermined speed range.

* * * * *